United States Patent
Kok

(10) Patent No.: US 6,249,581 B1
(45) Date of Patent: Jun. 19, 2001

(54) SPECTRUM-BASED ADAPTIVE CANCELLER OF ACOUSTIC ECHOES ARISING IN HANDS-FREE AUDIO

(75) Inventor: Hui Siew Kok, Singapore (SG)

(73) Assignee: Bitwave Pte. Ltd., Singapore (SG)

( * ) Notice: Subject to any disclaimer, the term of this patent is extended or adjusted under 35 U.S.C. 154(b) by 0 days.

(21) Appl. No.: 09/124,804

(22) Filed: Jul. 29, 1998

(30) Foreign Application Priority Data

Aug. 1, 1997 (SG) .................................................. 9702744

(51) Int. Cl.[7] .................................................. H04B 3/21
(52) U.S. Cl. .................................................. 379/409
(58) Field of Search .................................................. 379/410, 388, 379/389, 420, 406, 409; 370/291

(56) References Cited

U.S. PATENT DOCUMENTS

| | | | |
|---|---|---|---|
| 3,699,271 | * 10/1972 | Berkley et al. ........................ | 379/408 |
| 3,784,747 | * 1/1974 | Berkley et al. ........................ | 379/388 |
| 4,623,980 | * 11/1986 | Vary ...................................... | 708/313 |
| 4,644,108 | * 2/1987 | Crouse et al. ......................... | 379/406 |
| 4,903,247 | * 2/1990 | Gerwen et al. ....................... | 367/135 |
| 4,951,269 | * 8/1990 | Amano et al. ........................ | 367/135 |
| 5,583,784 | * 12/1996 | Kapust et al. ......................... | 702/77 |
| 5,588,089 | * 12/1996 | Beerends et al. ..................... | 704/205 |
| 5,659,619 | * 8/1997 | Abel ...................................... | 381/17 |
| 5,748,751 | * 5/1998 | Janse et al. ............................ | 381/93 |

OTHER PUBLICATIONS

Thomas W. Parsons, "Voice and Speech Processing," McGraw–Hill, Inc., New York, 1987, pp. 29–39.*

M. R. Asharif, F. Amano, S. Unagami, and K. Murano, "Acoustic Echo Canceler based on Frequency Bin Adaptive Filtering (FBAF)," Proc. Globecom '87, 1987, pp. 1940–1944.*

Kazuo Murano, Shigeyuki Unagami, and Fumio Amano, "Echo Cancellation and Applications," IEEE Communications Magazine, Jan. 1990, pp. 49–55.*

\* cited by examiner

Primary Examiner—William R. Korzuch
Assistant Examiner—Donald L. Storm
(74) Attorney, Agent, or Firm—Lawrence Y. D. Ho

(57) ABSTRACT

The present echo canceller utilizes the principle that the spectrum pattern of human speech does not change much in the short run. The inputs to the present echo canceller are x(t) and y(t), y(t) representing the incoming speech signal from a far-end speaker and x(t) representing the combination of speech signal from a near-end speaker and the echo. The processed forms of the input x(t) and y(t) are processed by applying the well-known Hanning window. They are then transformed into their respective frequency domain using the well-known fast Fourier transform (FFT), and the power spectrum $P_x$ and $P_y$ are calculated where $$P_x = |x_r(f)| + |x_i(f)| + \epsilon^* |x_r(f)| * |x_i(f)| \text{ and}$$

$$P_y = |y_r(f)| + |y_i(f)| + \epsilon^* |y_r(f)| * |y_i(f)|$$

where $\epsilon$ is a scaling factor which controls the amount of echo to be suppressed, and converting $P_x$ and $P_y$ to bark scales $P_x(b)$ and $P_y(b)$. The transfer function H(b) is then estimated using the Bark Scales. The transfer function is used to normalize $P_y(b)$, which, in turn together with $P_x(b)$, is: used to estimate the gain G(b) which will be used to suppress the echo. Subsequently, the Bark Scales are unwarped and the gain function is then used to suppress the echo from the input x(t). The well-known inverse FFT (IFFT) and overlap add are performed to yield an echo-free signal.

4 Claims, 7 Drawing Sheets

Table 1

| | | | | | |
|---|---|---|---|---|---|
| 0 | 0 | 0.3510 | 0.2464 | 0.7020 | 0.8224 |
| 0.0078 | 0.0001 | 0.3588 | 0.2575 | 0.7098 | 0.8316 |
| 0.0156 | 0.0005 | 0.3666 | 0.2688 | 0.7176 | 0.8405 |
| 0.0234 | 0.0011 | 0.3744 | 0.2804 | 0.7254 | 0.8492 |
| 0.0312 | 0.0019 | 0.3822 | 0.2922 | 0.7332 | 0.8576 |
| 0.0390 | 0.0030 | 0.3900 | 0.3042 | 0.7410 | 0.8658 |
| 0.0468 | 0.0044 | 0.3978 | 0.3165 | 0.7488 | 0.8738 |
| 0.0546 | 0.0060 | 0.4056 | 0.3290 | 0.7566 | 0.8815 |
| 0.0624 | 0.0078 | 0.4134 | 0.3418 | 0.7644 | 0.8890 |
| 0.0702 | 0.0099 | 0.4212 | 0.3548 | 0.7722 | 0.8962 |
| 0.0780 | 0.0122 | 0.4290 | 0.3681 | 0.7800 | 0.9032 |
| 0.0858 | 0.0147 | 0.4368 | 0.3816 | 0.7878 | 0.9099 |
| 0.0936 | 0.0175 | 0.4446 | 0.3953 | 0.7956 | 0.9164 |
| 0.1014 | 0.0206 | 0.4524 | 0.4093 | 0.8034 | 0.9227 |
| 0.1092 | 0.0238 | 0.4602 | 0.4236 | 0.8112 | 0.9287 |
| 0.1170 | 0.0274 | 0.4680 | 0.4380 | 0.8190 | 0.9345 |
| 0.1248 | 0.0312 | 0.4758 | 0.4528 | 0.8268 | 0.9400 |
| 0.1326 | 0.0352 | 0.4836 | 0.4677 | 0.8346 | 0.9453 |
| 0.1404 | 0.0394 | 0.4914 | 0.4829 | 0.8424 | 0.9503 |
| 0.1482 | 0.0439 | 0.4992 | 0.4984 | 0.8502 | 0.9551 |
| 0.1560 | 0.0487 | 0.5070 | 0.5139 | 0.8580 | 0.9597 |
| 0.1638 | 0.0537 | 0.5148 | 0.5292 | 0.8658 | 0.9640 |
| 0.1716 | 0.0589 | 0.5226 | 0.5442 | 0.8736 | 0.9680 |
| 0.1794 | 0.0644 | 0.5304 | 0.5590 | 0.8814 | 0.9719 |
| 0.1872 | 0.0701 | 0.5382 | 0.5735 | 0.8892 | 0.9754 |
| 0.1950 | 0.0760 | 0.5460 | 0.5878 | 0.8970 | 0.9788 |
| 0.2028 | 0.0823 | 0.5538 | 0.6018 | 0.9048 | 0.9819 |
| 0.2106 | 0.0887 | 0.5616 | 0.6156 | 0.9126 | 0.9847 |
| 0.2184 | 0.0954 | 0.5694 | 0.6292 | 0.9204 | 0.9873 |
| 0.2262 | 0.1023 | 0.5772 | 0.6425 | 0.9282 | 0.9897 |
| 0.2340 | 0.1095 | 0.5850 | 0.6556 | 0.9360 | 0.9918 |
| 0.2418 | 0.1169 | 0.5928 | 0.6684 | 0.9438 | 0.9937 |
| 0.2496 | 0.1246 | 0.6006 | 0.6810 | 0.9516 | 0.9953 |
| 0.2574 | 0.1325 | 0.6084 | 0.6933 | 0.9594 | 0.9967 |
| 0.2652 | 0.1407 | 0.6162 | 0.7054 | 0.9672 | 0.9978 |
| 0.2730 | 0.1491 | 0.6240 | 0.7172 | 0.9750 | 0.9988 |
| 0.2808 | 0.1577 | 0.6318 | 0.7289 | 0.9828 | 0.9994 |
| 0.2886 | 0.1666 | 0.6396 | 0.7402 | 0.9906 | 0.9998 |
| 0.2964 | 0.1757 | 0.6474 | 0.7513 | 0.9984 | 1.0000 |
| 0.3042 | 0.1851 | 0.6552 | 0.7622 | | |
| 0.3120 | 0.1947 | 0.6630 | 0.7729 | | |
| 0.3198 | 0.2045 | 0.6708 | 0.7833 | | |
| 0.3276 | 0.2146 | 0.6786 | 0.7934 | | |
| 0.3354 | 0.2250 | 0.6864 | 0.8033 | | |
| 0.3432 | 0.2356 | 0.6942 | 0.8130 | | |

FIG. 4

Table 2

| | |
|---|---|
| 0.0003 | 43.26769134 |
| 0.0006 | 30.59946649 |
| 0.0009 | 24.98810630 |
| 0.0012 | 21.64357944 |
| 0.0015 | 19.36150801 |
| 0.0018 | 17.67720700 |
| 0.0021 | 16.36836623 |
| 0.0024 | 15.31349887 |
| 0.0027 | 14.43986826 |
| 0.003 | 13.70091390 |
| 0.006 | 9.702519348 |
| 0.009 | 7.933921386 |
| 0.012 | 6.881237673 |
| 0.015 | 6.163943030 |
| 0.018 | 5.635261707 |
| 0.021 | 5.224994365 |
| 0.024 | 4.894789511 |
| 0.027 | 4.621691636 |
| 0.03 | 4.391010409 |
| 0.06 | 3.150790769 |
| 0.09 | 2.610057848 |
| 0.12 | 2.292793346 |
| 0.15 | 2.079714938 |
| 0.18 | 1.924946293 |
| 0.21 | 1.806607890 |
| 0.24 | 1.712779873 |
| 0.27 | 1.636347380 |
| 0.3 | 1.572769890 |
| 0.6 | 1.255067997 |
| 0.9 | 1.138933126 |
| 1.2 | 1.082425351 |
| 1.5 | 1.051281390 |
| 1.8 | 1.032885730 |
| 2.1 | 1.021535789 |
| 2.4 | 1.014321717 |
| 2.7 | 1.009637076 |
| 3 | 1.006545519 |
| 6 | 1.000171959 |

FIG. 5

Table 3

| | |
|---|---|
| 1 | 0.2508 |
| 2 | 0.1258 |
| 3 | 0.0631 |
| 4 | 0.0316 |
| 5 | 0.0159 |
| 6 | 0.0080 |
| 7 | 0.0040 |
| 8 | 0.0020 |
| 9 | 0.0010 |
| 10 | 0.0005 |

FIG. 6

SPECTRUM-BASED ADAPTIVE CANCELLER OF ACOUSTIC ECHOES ARISING IN HANDS-FREE AUDIO

FIELD OF THE INVENTION

The present invention relates generally to the field of acoustic echo cancellation in telecommunications, and particularly to a pseudo spectrum-based acoustic echo canceller which adaptively cancels echoes arising in hands-free audio and video teleconferencing and related systems without requiring a state machine or training.

BACKGROUND OF THE INVENTION

Acoustic echo cancellers and their applications in the field of telecommunication are well known to those skilled in the art. Many such cancellers and related technologies have been described in various publications including the following patent documents:

U.S. Pat. No. 5,548,642
U.S. Pat. No. 5,530,724
U.S. Pat. No. 5,506,901
U.S. Pat. No. 5,428,562
U.S. Pat. No. 5,406,583
U.S. Pat. No. 5,394,392
U.S. Pat. No. 5,384,806
U.S. Pat. No. 5,329,586
U.S. Pat. No. 5,206,854
U.S. Pat. No. 5,163,044
U.S. Pat. No. 5,146,494
U.S. Pat. No. 5,016,271
U.S. Pat. No. 5,001,701
U.S. Pat. No. 4,918,685
U.S. Pat. No. 4,817,081
U.S. Pat. No. 4,464,545

A typical acoustic echo canceller currently available uses what-is-known-as an adaptive filter which employs a well-known algorithm such as the algorithm known as the Least-Mean-Square algorithm, or LMS. This algorithm continuously adapts to changes in the placement of both the speaker and microphone and to changes in loudspeaker volume. For these cancellers, a state machine is needed to automatically determine each of the four states, i.e., receiving, transmitting, double-talk, and idle. In addition, in order to cancel the echoes, these cancellers much be trained, that is, they must "learn" the loudspeaker-to-microphone acoustic response function for the room it is servicing. Also, the acoustic compensation length is determined by the length of the filter that is determined by the host resource availability.

OBJECT OF THE INVENTION

It is an object of the present invention to provide an acoustic echo canceller which adaptively cancels echo arising in hands-free audio and video teleconferencing systems and other related systems where echo cancellation is required.

It is an another object of the present invention to provide an acoustic echo canceller which provides high-quality and low cost full duplex speech communication typical of dedicated video conferencing systems.

It is yet another object of the present invention to provide an acoustic echo canceller which does not require a state machine.

It is still yet another object of the present invention to provide an acoustic echo canceller which does not require training.

It is still yet another object of the present invention to provide an acoustic echo canceller which continuously adapts to changes in microphone and loudspeaker placement, loudspeaker volume setting, and the movement of people.

It is still yet another object of the present invention to provide an acoustic echo canceller which is independent of any standard.

It is still yet another object of the present invention to provide an acoustic echo canceller which can be connected directly to a PC soundcard and an ordinary telephone set.

SUMMARY OF THE INVENTION

A microphone array is used together with a block adaptive algorithm to effectively suppress acoustic echo arising in hands free voice communication. A the same time, the system is also capable of suppressing environmental noise.

The present echo canceller utilizes the principle that the spectrum pattern of human speech does not change much in the short run. The present echo canceller takes 256 overlap 128 samples in 16 ms intervals, or sample blocks. The power spectrum taken at time 0 and at any time within the 16 ms interval are essentially the same. This is true even though the waveform of the speech may change over time even in the short run. The echoes are simply a delayed form of a speech signal. Therefore, in following the principle described above, the spectrum of the speech signal and the spectrum of the echo taking are substantially the same.

The inputs to the present echo canceller are x(t) and y(t), y(t) representing the incoming speech signal from a far-end speaker and x(t) representing the combination of speech signal from a near-end speaker and the echo. The well-known normalized cross-correlation estimation between x(t) and y(t) is performed to determine the level of correlation between x(t) and y(t) which is quantitatively represented by the correlation coefficient C, a value of 1 for C being perfect correlation.

When the far-end speaker is speaking and the near-end speaker is not speaking, x(t) comprises of only the echo portion which is essentially a delayed form of y(t). In that case, there is almost a perfect correlation between x(t) and y(t) and the C value is near 1. When the near-end speaker is speaking and the far-end speaker is not speaking, the x(t) comprises only of the signal and the C value is near 0. When both the near-end and the far-end speakers are speaking simultaneously, the C value may be between 0 and 1, but typically near to 0 since the two speech signals will not be highly correlated. And of course, silence would result in a near 0 also, since respective noises will not be highly correlated. Certain decisions are based on whether the C value exceeds certain thresholds.

Since the echo is essentially a delayed y(t), the amount of delay is estimated by measuring the time shift required to produce the maximum C value. Once the delay is determined, the two channels of inputs are aligned by time-shifting x(t) to match y(t). The amplitude of the x(t) and y(t) is then normalized by first determining a certain gain factor, and then multiplying y(t) by the gain factor.

The processed forms of the input x(t) and y(t) are next processed by applying the well-known Hanning window. They are then transformed into their respective frequency domain using the well-known fast Fourier transform (FFT)

and then to Bark Scales, $P_x(b)$ and $P_y(b)$, using the Bark Frequency Warping technique. The transfer function H(b) is then estimated using the Bark Scales. The transfer function is used to normalize $P_y(b)$, which, in turn together with $P_x(b)$, is used to estimate the gain G(b) which will be used to suppress the echo. Subsequently, the Bark Scales are unwarped and the gain function is then used to suppress the echo from the input x(t). The well-known inverse FFT (IFFT) and overlap add are performed to yield an echo-free signal.

BRIEF DESCRIPTION OF THE DRAWINGS

FIG. 4 is a lookup Table 1 listing values for $G_s$.

FIG. 5 is a lookup Table 2 listing values for $\overline{L}_b(b)$.

FIG. 6 is a lookup Table 3 listing values for $W_i$.

DETAILED DESCRIPTION OF THE INVENTION

Figure 1:
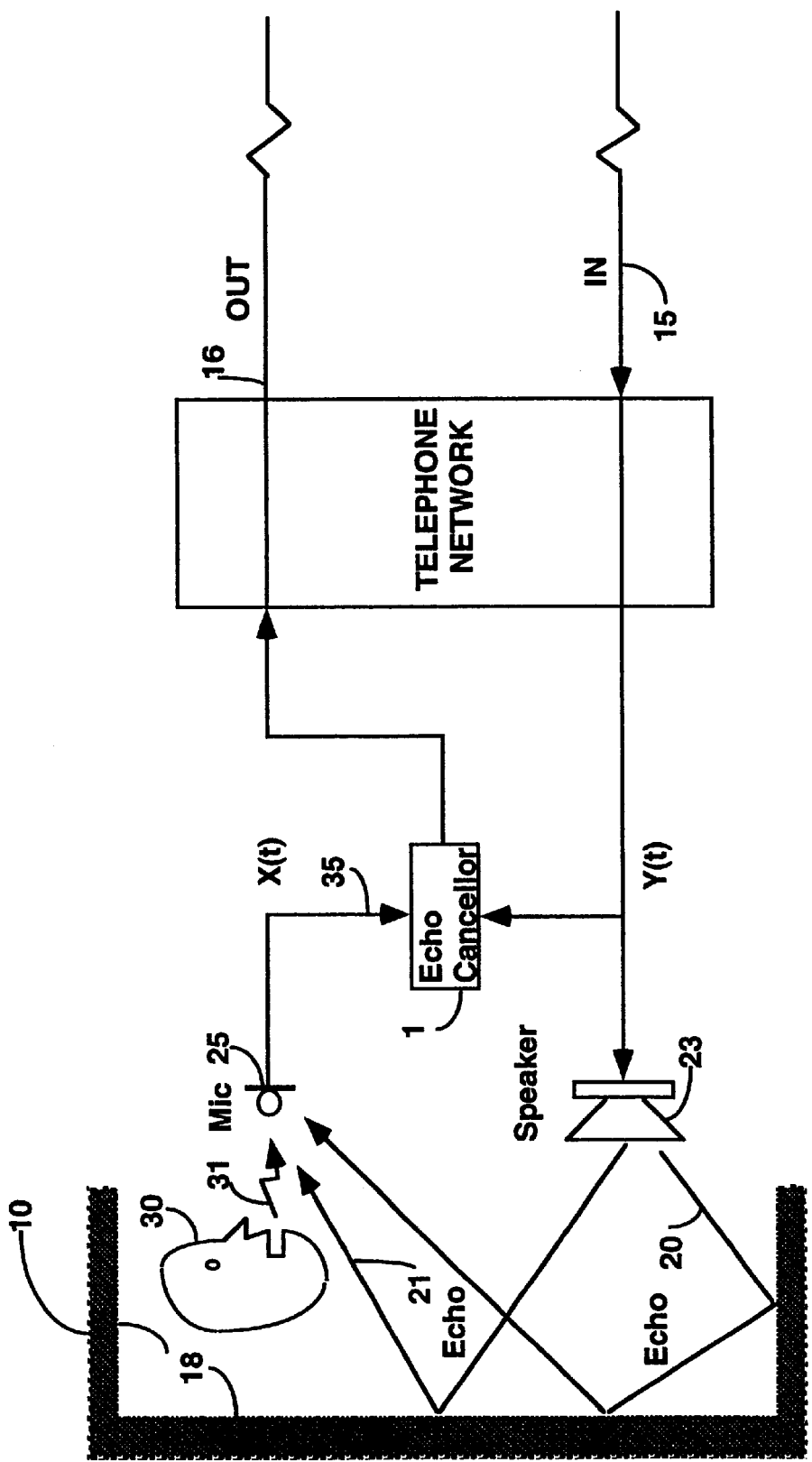
FIG. 1 is a functional diagram illustrating the present echo canceller deployed in a teleconference room setting.

FIG. 1 illustrates schematically the present echo canceller 1 placed in a telephone conference system operating in a room 10. The echo canceller 1 is serially connected to a telecommunications network through incoming line 15 and outgoing line 16. Room reverberative surfaces 18 define multiple echo paths which depend on room geometry. Two such echo paths, 20 and 21, are illustrated. Speech originating from a far-end speaker (speaker not shown) emanating from the room loudspeaker 1 travels along the echo paths 20 and 21, among others paths, and enters microphone 25 with various time delays. Speech 31 from the near-end speaker 30 also enters the microphone 25. Both the speech signal and the echo, denoted as x(t), travel along the line 35 and into the echo canceller 1. The speech signal from the far-end speaker, denoted as y(t), which is essentially the same as the echo without the delay, is also an input to the echo canceller 1 via line 15.

To optimize the performance of the present echo canceller, a microphone array consisting of 3 microphones is used instead of a single microphone, and a well-known beam-forming technique is employed. This arrangement enhances the strength of the near-end speech signal while reducing the strength of the echo signal from the loudspeaker. This occurs because the array forms an acoustic beam at the signal direction and a null in the speaker direction. It has been found that this microphone array significantly enhances the performance of the present invention.

The present echo canceller utilizes the principle that the spectrum pattern of human speech does not change much in the short run. The present echo canceller takes 256 overlap 128 samples in 16 ms intervals, or sample blocks. The power spectrum of a speech signal taken at time 0, for instance, and at any time within the 16 ms interval are essentially the same. This is true even though the waveform of the speech may change over time even in the short run. In referring to FIG. 1, the echo taking the paths 21 and 20, for instance, are simply a delayed form of y(t). Therefore, in following the principle described above, the spectrum of the speech signal from the far-end speaker's speech signal y(t) and the spectrum of the echo taking the paths 21 and 20 are substantially the same. The following description will make it clearer to the those skilled in the art, how this principle is utilized in the present echo canceller to cancel the echo in a manner which is more effective than the currently-available systems.

Figure 2:
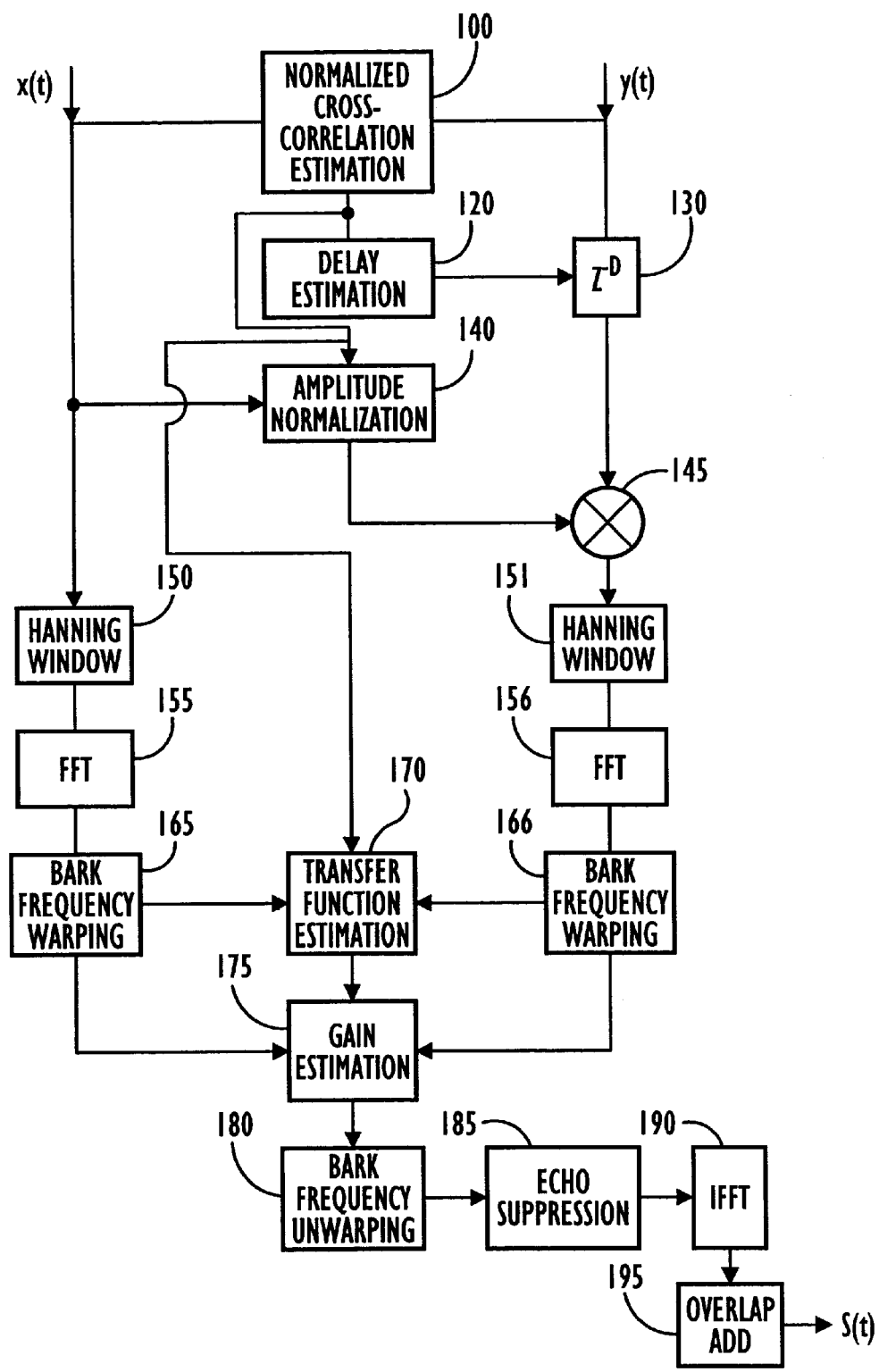
FIG. 2 is functional block diagram illustrating the circuitry of the present echo canceller.

FIG. 2 illustrates a functional block diagram representing the circuitry for the echo canceller 1 referred to in FIG. 1. Typically, the circuitry would be implemented in a DSP chip or a microprocessor, though it can be implemented In other ways which are known to one skilled in the art. A brief description of the blocks will be given for FIG. 2. A more detailed flow diagram and description for the echo cancellation process employed by the circuit of FIG. 2 shall follow thereafter.

Referring to FIG. 2 in conjuction with FIG. 1, the inputs to the circuit are x(t) and y(t), y(t) representing the incoming speech signal from the far-end speaker and x(t) representing the combination of speech signal from the near-end speaker and the echo. The well-known normalized cross-correlation estimation between x(t) and y(t) is performed in block 100 to determine the level of correlation between x(t) and y(t) which is quantitatively represented by the correlation coefficient C, a value of 1 for C being perfect correlation.

When the far-end speaker is speaking and the near-end speaker 30 (see FIG. 1) is not speaking, x(t) comprises of only the echo portion which is essentially a delayed form of y(t). In that case, there is almost a perfect correlation between x(t) and y(t) and the C value is near 1. When the near-end speaker 30 is speaking and the far-end speaker is not speaking, the x(t) comprises only of the signal and the C value is near 0. When both the near-end 30 and the far-end speakers are speaking simultaneously, the C value may be between 0 and 1, but typically near to 0 since the two speech signals will not be highly correlated. And of course, silence would result in a near 0 also, since respective noises will not be highly correlated. Certain decisions are based on whether the C value exceeds certain thresholds.

Since the echo is essentially a delayed y(t), the amount of delay is estimated in block 120 by measuring the time shift required to produce the maximum C value. Once the delay is determined, the two channels of inputs are aligned in block 130 by time-shifting y(t) to match x(t). The amplitude of the x(t) and y(t) is then normalized in block 140 by first determining a certain gain factor, and then multiplying y(t) by the gain factor in block 145.

The processed form of the input x(t) is next processed in blocks 150 through 165; the processed form of the input y(t) is next processed 151 through 166. Because both channels are processed in an identical manner which is well known and understood, only a brief description will be provided. In blocks 150 and 151, the well-known Hanning window is applied to the processed inputs. They are then transformed into their respective frequency domain using the well-known fast Fourier transform (FFT), blocks 155 and 156, and then to Bark Scales, $P_x(b)$ and $P_y(b)$, using the Bark Frequency Warping technique in blocks 165 and 166.

In block 170, the transfer function H(b) is estimated. The transfer function is then used in block 175 to normalize $P_y(b)$, which is then used to estimate the gain G(b) which will be used to suppress the echo. In block 180, the Bark Scales are unwarped. The gain function is then used to suppress the echo from the input spectrum in block 185. The well-known inverse FFT (IFFI) is performed in block 190 and the overlap add in block 195 to yield an echo-free signal.

Using the flow diagrams of FIGS. 3a through 3c and the circuit diagram of FIG. 2, the echo cancellation process employed by the present invention will now be described in greater detail.

Figure 3A:
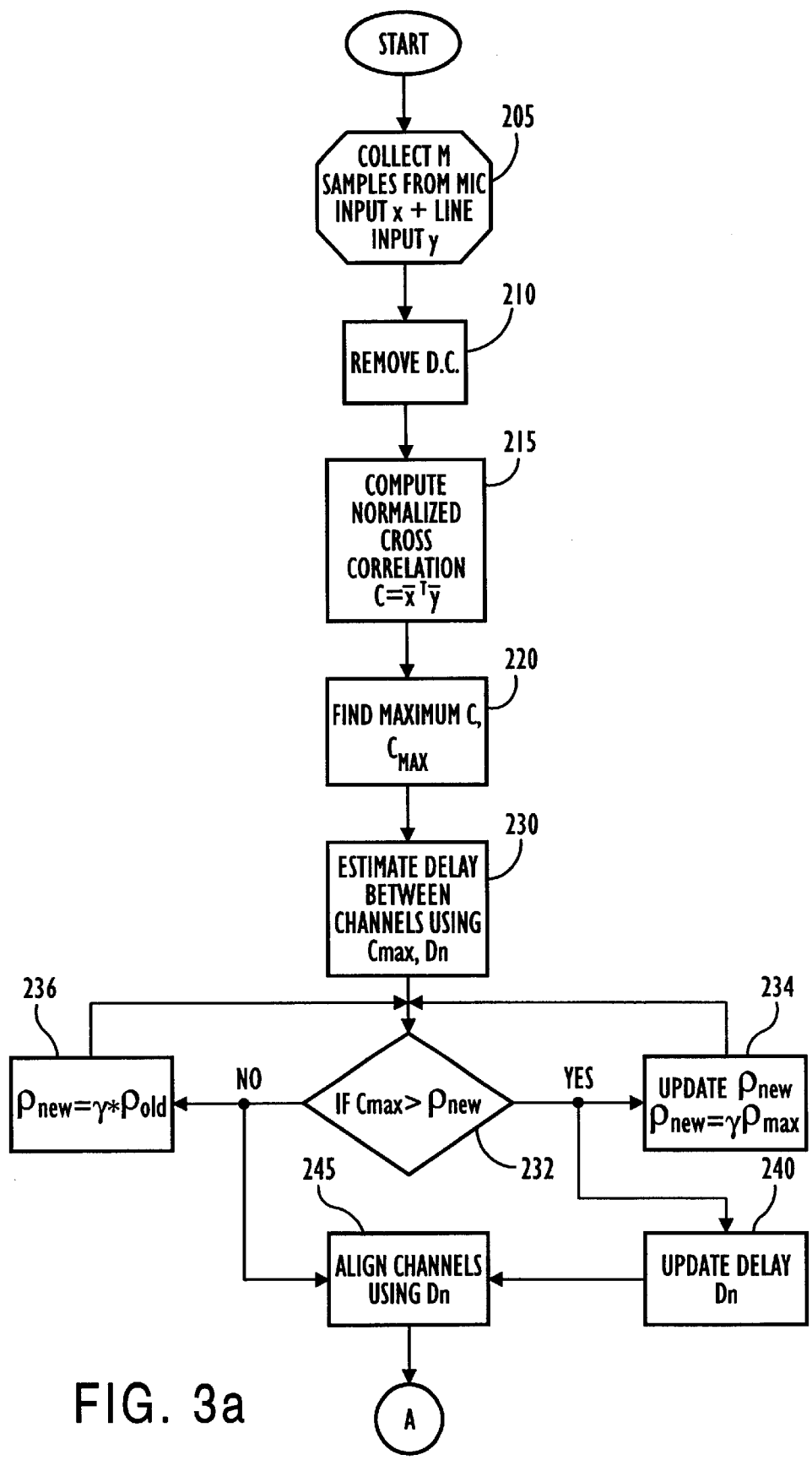
FIGS. 3a through 3c is a continuous flow diagram illustrating the echo canceling process employed by the present echo canceller.
Figure 3B:
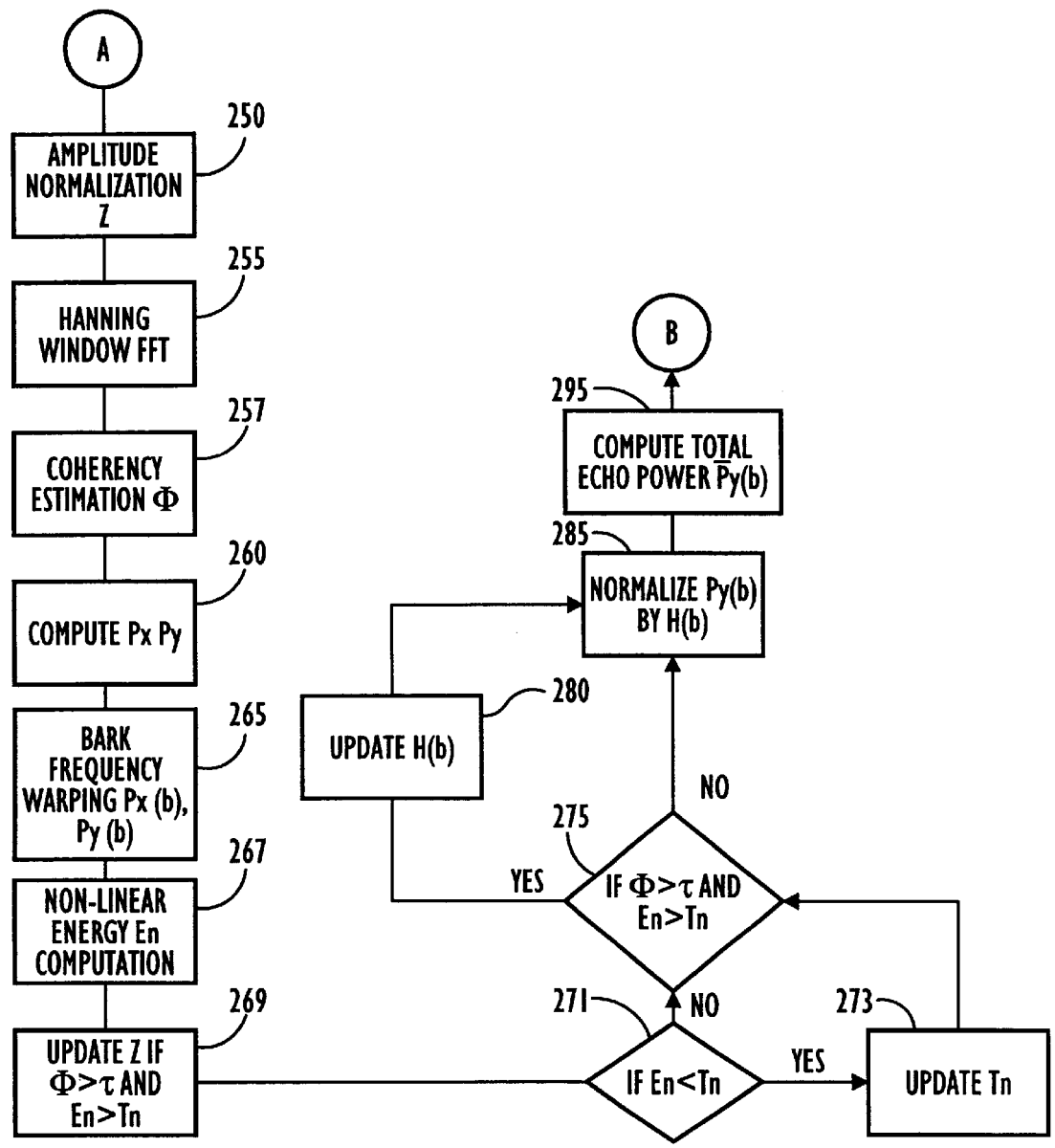
Figure 3C:
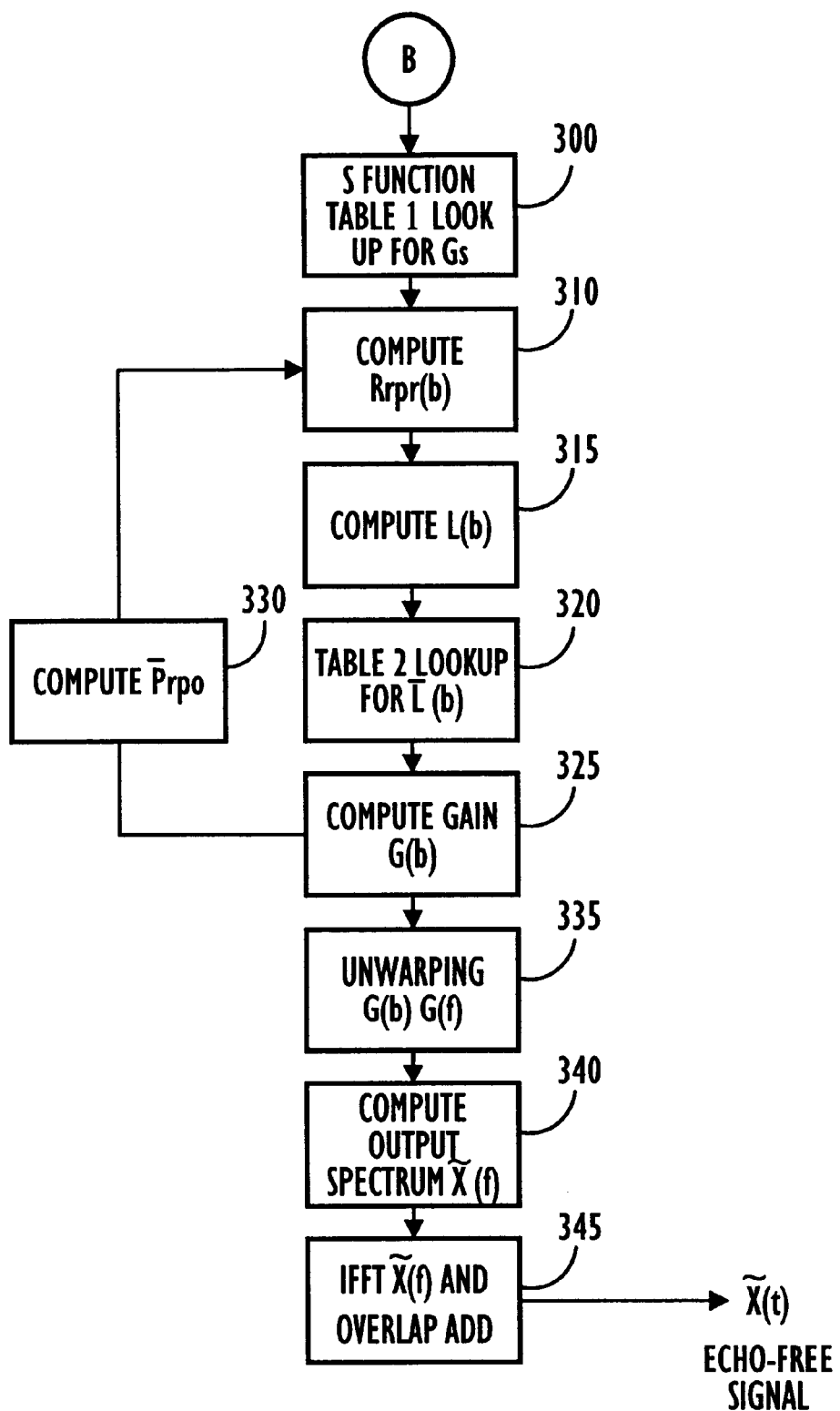

Referring now to FIG. 3a, M samples (in this case 256 overlap 128, though other values are possible) are taken from the inputs x(t) and y(t) in step 205 at 16 ms block intervals (8 KHz sampling rate). Sometimes a dc component exists with the inputs and so it is removed, step 210, using a common procedure well known to those skilled in the art. The next step, 220, is to compute the normalized cross-correlation as represented by a value C where, $$C = \bar{x}^T \bar{y} \text{ and } \bar{x} = \frac{x}{\sqrt{x^T x}}, \quad \bar{y} = \frac{y}{\sqrt{y^T y}}$$

where T denotes the transpose of a vector. A number of C values will result from this calculation so in step 220, the maximum value representing C, or $C_{max}$, is chosen.

Once $C_{max}$ is found, the amount of delay between the two inputs, or $D_n$, is estimated in step 230. A comparison is made in step 232 to determine if $C_{max} > \rho_{new}$ where $\rho_{new}$ initially has a value of 0. If the condition is met, i.e., $C_{max} > \rho_{new}$, then $\rho_{new}$ is updated following the formula $\rho_{new} = \gamma C_{max}$ where a value for $\gamma$ is empirically chosen to be 0.8. The delay $D_n$ is then updated based on the most current value of $C_{max}$. On the other hand, if the condition $C_{max} > \rho_{new}$ is not met, then $\rho_{new}$ is updated using the formula $\rho_{new} = \gamma \rho_{old}$ where $\rho_{old}$ simply represents the previous $\rho_{new}$, and the delay $D_n$ from the previous sample block is used. Whether or not the delay $D_n$ is updated or not, the two inputs, x(t) and y(t), are aligned by delaying the y(t) by the amount $D_n$ in step 245.

It is important to note here that while the updating of the delay $D_n$ is a process included in the preferred embodiment of present invention, it is not crucial. For instance, the present canceller can still function, though not as optimally, even if steps 232, 234, 236, and 240 were eliminated, and step 245 were to be performed immediately after 230 using the same $D_n$ each time.

After the alignment of the inputs in step 245, in step 250, an amplitude normalization is performed on the inputs using a gain normalization factor, Z which is initially set at 1, but which is continually updated in step 269 when the stated condition is met. In step 255, the well-known Hanning Window is applied and the FFT is computed as follows:

$$X(f) = x_r(f) + jx_i(f)$$

where X(f)=FFT(x)

$$Y(f) = y_r(f) + jy_i(f)$$

where Y(f)=FFT(y)
Coherence estimation is performed in step 257, where the coherence factor, $\Phi$, is computed is as follows:

$$\Phi = \text{Real}\left(\frac{X(f)\text{conj}(Y(f))}{\text{norm}(X(f))\text{norm}(Y(f))}\right)$$

It can be seen from this formula that if X(f) and Y(f) are coherent, $\Phi$ will be near to 1 which indicates that only the echo is present. However, if $\Phi$ is near to 0, that indicates either a double-talk or only near-end speech or only silence. The coherence factor, $\Phi$, is used together with a non-linear energy function described in step 267 (see below) to further control the echo suppression.

Thereafter, in step 260, $P_x$ and $P_y$ are computed as follows:

$$P_x = |x_r(f)| + |x_i(f)| + \epsilon * |x_r(f)| * |x_i(f)|$$

$$P_y = |y_r(f)| + |y_i(f)| + \epsilon * |y_r(f)| * |y_i(f)|$$

where $\epsilon$ is a scaling factor which controls the amount of echo to be suppressed and is a trade-off between speech quality and echo suppression. In step 265, $P_x$ and $P_y$ are converted to Bark Scales $P_x(b)$ and $P_y(b)$ using the well-known Bark Frequency Warping technique.

A non-linear energy computation is performed in step 267 where the energy, $E_n$, is computed as follows:

$$E_n = \sqrt{\sum_{b=1}^{L} P_y(b)(b)^2}$$

where L represents the number of Bark frequency band. In the preferred embodiment L=18 is used.

In step 269, the gain normalization factor, Z, is updated if the following conditions are met: $\Phi > \tau$ and $E_n > T_n$. The gain normalization factor, Z, is computed as follows:

$$Z = Z\sigma + (1 - \sigma)\frac{\sum_{i=1}^{N}|x_i|}{\sum_{i=1}^{N}|y_i|}$$

where $\sigma < 1$. It is important to note that while this is the preferred method other gain normalization methods may be used.

In step 271, it is determined if the condition $E_n < T_n$ is met. If yes, $T_n$ is updated in step 273. $T_n$ is computed as follows:

$$T_n = VT_n' + (1-V)E_n$$

where $T_n'$ is the $T_n$ from the previous run where $V < 1$. It is important to note here that the noise threshold, $T_n$, is initially estimated during the silence period. It is computed as follows:

$$T_n = E_n * \theta$$

where $\theta$ is chosen between the range 1.125 and 1.25.

In step 275, it is determined whether $\Phi > \tau$ and $E_n > T_n$. In the preferred embodiment, $\tau = 0.65$, though a different value may be optimal for $\tau$ under different configuration, e.g., different microphone set-up. If the condition in step 275 is met, the transfer function H(b) is updated from its initial value of 1 in step 280. If the condition in step 275 is not met, then the step 285 is performed without updating the H(b). The H(b) is calculated as follows:

$$H(b) = \alpha H(b) + (1 - \alpha)\left(\frac{P_x(b)}{P_y(b)}\right) \text{ where } \alpha < 1$$

In step 285, $P_y(b)$ is normalised by H(b) as follows:

$$\tilde{P}_y(b) = H(b) * P_y(b)$$

A buffer is provided to store M old values of $\tilde{P}_y(b)$. In step 295, the totalecho power is computed as follows:

$$\tilde{P}_y(b) = \sum_{i=1}^{m} W_i * \tilde{P}_y^j(b)$$

$W_i$ is a weighting fraction and its value depends on the echo path characteristics. The typical values are listed in Table 3. In step 300, the value of $G_s$ is found by referring to lookup Table 1 using the current value for $\Phi$.

In step 310, $R_{rpr}(b)$ is computed as follows:

$$R_{rpr}(b) = \frac{R_{pr}(b)}{(1+R_{pr}(b))}$$

where $$R_{pr}(b) = \gamma P_{rpo}(b) + (1-\gamma)\overline{P}_{rpo} * G_s$$

where $\gamma$ is a smooth factor with $\gamma<1$ ($\gamma\approx 0.02$) and $\overline{P}_{rpo}$ initially has a value of 0.
and $$P_{rpo}(b) = R_{po}(b) - 1$$

where if $P_{rpo}(b)<0$ then $P_{rpo}(b)=0$ $$\text{and} \quad R_{po}(b) = \frac{P_x(b)}{\overline{P}_y(b)} * G_s$$

In step 315, L(b) is computed as follows:

$$L_b = R_{rpr}(b) * R_{po}(b)$$

In step 320, a look-up Table 2 is used to find a value for $\overline{L}_b(b)$. In step 325, the gain G(b) is computed as follows:

$$G(b) = R_{rpr}(b) * \overline{L}_b(b)$$

In step 330, $\overline{P}_{rpo}$ is computed as follows:

$$\overline{P}_{rpo} = \frac{G(b) * P_x(b)}{\overline{P}_y(b)}$$

After the step 330, the steps 310, 315, 320, 325 and 330 are repeatedly performed for each sample block of input, each loop producing an updated value for the parameters Involved.

In step 335, the G(b) is unwarped to produce G(f). The output spectrum is then computed in step 340 as follows:

$$\tilde{X}(f) = G(f) * X(f)$$

In step 345 the well-known inverse FFT (IFFT) and overlap add are performed on $\tilde{X}(f)$ and to produce an echo-free signal $\tilde{X}(t)$.

It is very important for one of ordinary skilled in the art to understand that many of the steps and/or components of the preferred embodiment of the echo canceller of the present invention are included as a way of optimizing the performance of the canceller, and, therefore, may be substituted or even eliminated in some instances without negating the function and the purpose of the present invention. In addition, although the preferred embodiment of the present invention was described in the context of a teleconferencing system, it is clear that the present echo canceller may be used in other telecommunications systems where echoes are present in the similar manner as the scenarios described herein. While one skilled in the art could certainly appreciate these principles, some examples will be given for illustration purposes.

For instance, in referring to FIG. 2 and FIG. 3, the cross-correlation estimation technique employed here may be substituted with other techniques for determining the correction between two signals. Also, the amplitude normalisation, the use of Hanning Window and Bark Scales, while contributing to the effectiveness of the preferred embodiment of the present invention, may be eliminated under some circumstances without completely negating the function of the present invention. The Bark Scales, for instance, are used in this case as way of reducing computation time and, therefore, may not unduly effect the performance of the present echo canceller. In addition, although the Hanning Window was found to be optimal in this case, it may be replaced with other windows. Similarly, while the choice to take 256 overlap 128 samples in 16 ms intervals was found to be optimal in this case, other sample sizes and intervals may be chosen. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

I claim:

1. An acoustic echo canceller for a telecommunications system adapted for communication between a first speaker and a second speaker, said system having a microphone and a loud-speaker, said microphone receiving a speech signal from said first speaker and an echo from a speech of said second speaker emanating from said loud-speaker, comprising:

a means for collecting samples of two inputs from said telecommunications system, x(t) and y(t), said y(t) being a speech signal from a first speaker, said x(t) being a combination of a speech signal from a second speaker and an echo signal of said y(t);

a means for estimating a delay $D_n$ between the x(t) and y(t);

a means for aligning x(t) and y(t) by time-shifting y(t) by $D_n$;

a means for normalizing an amplitude of x(t) and y(t);

a means for applying a Hanning window and transforming said signals x(t) and y(t) into a frequency domain where $X(f) = x_r(f) + jx_i(f)$ and $Y(f) = y_r(f) + jy_i(f)$ and whore $X(f) = FFT(x)$ and $Y(f) = FFT(y)$;

a means for computing a power spectrum $P_x$ and $P_y$ where $$P_x = |x_r(f)| + |x_i(f)| + \epsilon * |x_r(f)| * |x_i(f)| \text{ and}$$

$$P_y = |y_r(f)| + |y_i(f)| + \epsilon * |y_r(f)| * |y_i(f)|$$

where $\epsilon$ is a scaling factor which controls the amount of echo to be suppressed, and converting $P_x$ and $P_y$ to bark scales $P_x(b)$ and $P_y(b)$;

a means for estimating a transfer function H(b) and normalizing $P_x(b)$ and $P_y(b)$ by said transfer function;

a means for estimating a gain function G(b), said G(b) being calculated from $P_x$ and $P_y$;

a means for unwarping said G(b) to yield G(f);

a means for multiplying said signal X(f) by said gain function G(f) to yield $\tilde{X}(f)$; and a means for performing an inverse transform and overlap add to convert said signal $\tilde{X}(f)$ to yield an echo-free signal $\tilde{X}(t)$.

2. The acoustic echo canceller as recited in claim 1 further comprising a means for estimating a correlation C between the x(t) and y(t); and a means for updating said delay said delay being updated based on a value of C.

3. The acoustic echo canceller as recited in claim 1 wherein said H(b) is calculated as follows:

$$H(b) = \alpha H(b) + (1-\alpha)\left(\frac{P_x(b)}{P_y(b)}\right) \text{ where } \alpha < .$$

4. The acoustic echo canceller as recited in claim 1 wherein $$G(b) = R_{rpr}(b) * \bar{L}_b(b)$$

where $$L_b = R_{rpr}(b) * R_{po}(b)$$

$$R_{rpr}(b) = \frac{R_{pr}(b)}{(1+R_{pr}(b))} \text{ and}$$

$$R_{pr}(b) = \gamma P_{rpo}(b) + (1-\gamma)\bar{P}_{rpo} * G_s$$

where $\gamma$ is a smooth factor with $\gamma < (\gamma \approx 0.02)$ and $\bar{P}_{rpo}$ initially has a value of zero where $\bar{P}_{rpo} = \frac{G(b) * P_x(b)}{\bar{P}_y(b)}$ and where $G_s$ is found by table lookup using a current value for a coherence factor $\Phi$ and $$P_{rpo}(b) = R_{po}(b) -$$

where if $P_{rpo}(b) < 0$ then $P_{rpo}(b) = 0$ and $R_{po}(b) = \frac{P_x(b)}{\bar{P}_y(b)} * G_s.$

\* \* \* \* \*